United States Patent
Tchapda

(10) Patent No.: US 9,990,140 B2
(45) Date of Patent: *Jun. 5, 2018

(54) METHODS OF PROVIDING ACCESS TO I/O DEVICES

(71) Applicant: Micron Technology, Inc.

(72) Inventor: Yves Constantin Tchapda, Astley (GB)

(73) Assignee: Micron Technology, Inc., Boise, ID (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/077,334

(22) Filed: Mar. 22, 2016

(65) Prior Publication Data

US 2016/0202913 A1    Jul. 14, 2016

Related U.S. Application Data

(63) Continuation of application No. 14/603,934, filed on Jan. 23, 2015, now Pat. No. 9,298,374, which is a
(Continued)

(30) Foreign Application Priority Data

Jun. 10, 2008   (GB) .................................. 0810581.9

(51) Int. Cl.
*G06F 13/00* (2006.01)
*G06F 3/06* (2006.01)
(Continued)

(52) U.S. Cl.
CPC .............. *G06F 3/061* (2013.01); *G06F 3/067* (2013.01); *G06F 3/0659* (2013.01);
(Continued)

(58) Field of Classification Search
CPC ........ G06F 3/061; G06F 3/067; G06F 3/0659; G06F 3/0613; G06F 3/0635; G06F 3/0683; G06F 3/0665; G06F 13/1642; G06F 13/404; G06F 13/4022; H04L 67/1097

See application file for complete search history.

(56) References Cited

U.S. PATENT DOCUMENTS

6,763,455 B2 *  7/2004  Hall ...................... G06F 9/4411
                                                                   711/111
6,977,927 B1 * 12/2005  Bates .................... G06F 3/0605
                                                                   370/381
(Continued)

FOREIGN PATENT DOCUMENTS

CN            101114206 A   *  1/2008
GB              2455347 A   *  6/2009  ............. H04L 49/35

OTHER PUBLICATIONS

"PCI Express Technology" by Jim Brewer & Joe Sekel, White Paper from www.dell.com/r&d; Feb. 2004.*

*Primary Examiner* — Jing-Yih Shyu
(74) *Attorney, Agent, or Firm* — Barnes & Thornburg LLP

(57) ABSTRACT

A method of providing one or more computing devices with access to a plurality of resources. The plurality of resources are provided by at least one physical device. The method comprises, at a first control element receiving a data packet transmitted by one of said one or more computing devices, and determining whether said data packet comprises a command including a first logical identifier identifying one of said resources. If it is determined that said data packet comprises a command including a first logical identifier a second logical identifier is obtained, the second logical identifier being associated with said first logical identifier and identifying said one of said resources. A request including said second logical identifier is transmitted to a second control element, the second control element being arranged to identify a physical device associated with said second logical identifier and to forward said request to the identified physical device.

20 Claims, 9 Drawing Sheets

Related U.S. Application Data continuation of application No. 14/024,126, filed on Sep. 11, 2013, now Pat. No. 8,966,135, which is a continuation of application No. 12/481,312, filed on Jun. 9, 2009, now Pat. No. 8,560,742.

(60) Provisional application No. 61/060,238, filed on Jun. 10, 2008.

(51) Int. Cl.
  *G06F 13/40* (2006.01)
  *H04L 29/08* (2006.01)
  *G06F 13/16* (2006.01)

(52) U.S. Cl.
  CPC ........ *G06F 13/1642* (2013.01); *G06F 13/404* (2013.01); *G06F 13/4022* (2013.01); *H04L 67/1097* (2013.01); *G06F 3/0605* (2013.01); *G06F 3/0613* (2013.01); *G06F 3/0635* (2013.01); *G06F 3/0665* (2013.01); *G06F 3/0683* (2013.01)

(56) References Cited

U.S. PATENT DOCUMENTS

| | | | | |
|---|---|---|---|---|
| 7,130,935 B2 * | 10/2006 | Sauber | ............... | G06F 13/4045 345/501 |
| 7,281,062 B1 * | 10/2007 | Kuik | ............... | G06F 13/385 370/395.52 |
| 7,984,260 B2 * | 7/2011 | Morishita | ............. | G06F 3/0605 711/114 |
| 8,423,690 B2 * | 4/2013 | Slaight | ............... | G06F 13/4022 710/313 |
| 2003/0140210 A1 * | 7/2003 | Testardi | ............... | G06F 3/0601 711/203 |
| 2003/0145045 A1 * | 7/2003 | Pellegrino | ............. | G06F 3/0601 709/203 |
| 2003/0217219 A1 * | 11/2003 | Sharma | ............... | G06F 13/4221 710/311 |
| 2004/0139237 A1 * | 7/2004 | Rangan | ............... | G06F 3/0613 710/1 |
| 2006/0159115 A1 * | 7/2006 | Haneda | ............... | G06F 11/0745 370/422 |
| 2007/0061454 A1 * | 3/2007 | Lee | ...................... | G06F 3/0607 709/225 |

* cited by examiner

| Mapping table address | Server LUN | HBA LUN | Valid Flag | HBA LUN | Valid Flag | HBA LUN | Valid Flag | HBA LUN | Valid Flag |
|---|---|---|---|---|---|---|---|---|---|
| 0 | 0 | 0 | 1 | 8 | 1 | 14 | 1 | 18 | 1 |
| 1 | 1 | 1 | 1 | 9 | 1 | 15 | 1 | 19 | 1 |
| 2 | 2 | 2 | 1 | 10 | 1 | 16 | 1 | 20 | 1 |
| 3 | 3 | 3 | 1 | 11 | 1 | 17 | 1 | 21 | 1 |
| 4 | 4 | 4 | 1 | 12 | 1 | 0 | 0 | 0 | 0 |
| 5 | 5 | 5 | 1 | 13 | 1 | 0 | 0 | 0 | 0 |
| 6 | 6 | 6 | 1 | 0 | 0 | 0 | 0 | 0 | 0 |
| 7 | 7 | 7 | 1 | 0 | 0 | 0 | 0 | 0 | 0 |

FIG 6

METHODS OF PROVIDING ACCESS TO I/O DEVICES

The present application is a continuation of U.S. patent application Ser. No. 14/603,934, filed Jan. 23, 2015 (now U.S. Pat. No. 9,298,374), which is a continuation of U.S. patent application Ser. No. 14/024,126, filed Sep. 11, 2013 (now U.S. Pat. No. 8,966,135), which is a continuation of U.S. patent application Ser. No. 12/481,312, filed Jun. 9, 2009 (now U.S. Pat. No. 8,560,742), which claims priority under 35 U.S.C. § 119(a) to British Patent Application No. 0810581.9, filed Jun. 10, 2008, and which claims the benefit under 35 U.S.C. § 119(e) of U.S. Provisional Application No. 61/060,238, filed Jun. 10, 2008, each of which is hereby expressly incorporated by reference in its entirety.

The present invention relates to a method and apparatus for providing computers with access to resources provided by one or more physical devices, such as storage devices.

It is often necessary to send data between devices in a computer system, for example it is often necessary to connect a processing device to a plurality of input and output devices. Appropriate data communication is achieved by connecting the devices in such a way as to allow them to send data packets to each other over a physical link, which may be a wired link or a wireless link.

It is known in the art to use a switch to route data packets from an output of one device to inputs of one or more other devices. Such a switch comprises one or more input ports arranged to allow the data packets to be received by the switch, and a plurality of output ports arranged to allow the data to be transmitted from the switch.

Many conventional computer systems do not share input/output (I/O) devices. That is, each computer has its own dedicated I/O devices. It is, however, advantageous to allow the sharing of I/O devices such that a plurality of computers can access one or more shared I/O devices. This allows an I/O device to appear to a computer system to be dedicated (i.e. local) to that computer system, while in reality it is shared between a plurality of computers. Sharing of I/O devices can lead to better resource utilisation, scalability, ease of upgrade, and improved reliability.

Sharing of I/O devices can be implemented using what is known as I/O virtualization. I/O Virtualization allows resources (e.g. memory) associated with a particular physical device to be shared by a plurality of computers. One advantage of I/O virtualization is that it allows an I/O device to appear to function as multiple devices, each of the multiple devices being associated with a particular computer.

One application of I/O virtualization allows I/O devices on a single computer to be shared by multiple operating systems running concurrently on that computer. Another application of I/O virtualization, known as multi-root I/O virtualization, allows multiple independent computers to share a set of I/O devices. Such computers may be connected together by way of a computer network.

One particular application of I/O virtualization which creates particular challenges is the sharing of storage devices such as hard disk drives.

One common protocol for communicating with storage devices is the Small Computer Systems Interface (SCSI) protocol. In a system based upon the SCSI protocol, groups of physical storage devices (or groups of parts of physical storage devices) are grouped together to provide logical storage units, each of which is allocated a Logical Unit Number (LUN). Each logical storage unit is an addressable block of storage created from one or more disks. Having defined logical storage units and allocated LUNs to those units, the LUNs can be used in commands defined using the SCSI command protocol to identify a logical storage unit. A SCSI device (such as a host bus adapter) is arranged to receive a command specifying a LUN and to determine which part of which disk should be accessed in response to the received command.

It is known in the art to partition a particular storage device into a plurality of partitions and to allocate different partitions to different computers. Where the SCSI protocol is used, the use of logical storage units is known in providing shared access to storage resources. More specifically, particular computers are provided with access to one or more logical storage units which are identified using LUNs. Processing is then carried out to ensure that a computer accessing a particular logical storage unit has been allocated access to that logical storage unit, so as to ensure that computers are only able to access logical storage units to which they have been granted access.

While the use of logical storage units and their allocation to different computers as described above allows particular storage to be shared between the different computers, the systems described above typically rely upon the SCSI device receiving commands specifying LUNs to ensure that the device from which a command has originated has been given access to the relevant logical storage unit.

Furthermore, it is often the case that a computer will need to be allocated a contiguous range of LUNs starting from a LUN of 0. It can be seen a contiguous range of LUNs starting at 0 can only be provided for each computer in a shared environment of the type described above, if LUNs used by each computer are mapped to global LUNs which are used by the SCSI device. The necessary translation is often carried out by the SCSI device managing access to the storage devices.

While providing functionality of the type described above within a SCSI device allows storage to be shared, it is disadvantageous in that the SCSI device must be configured to carry out the required processing. That is, a SCSI device which is not configured to carry out the required processing can not be used where different logical storage units are to be allocated to different computers.

Where a SCSI device is not configured to support sharing, an alternative solution is to provide translation between LUNs specific to a particular computer and global LUNs in software running on each of the computers. The use of such software is however disadvantageous in that it requires special software to be installed on each computer, and further requires processing to be carried out to ensure that a particular global LUN is only allocated to a particular computer.

Thus, while various solutions have been proposed to allow the sharing of storage devices, each of these solutions has its own drawbacks and disadvantages.

It is an object of an embodiment of the present invention to obviate or mitigate one or more of the disadvantages set out above.

According to a first aspect of the present invention, there is provided, a method of providing one or more computing devices with access to a plurality of resources. The plurality of resources are provided by at least one physical device. The method comprises, at a first control element:

receiving a data packet transmitted by one of said one or more computing devices;

determining whether said data packet comprises a command including a first logical identifier identifying one of said resources; and if it is determined that said data packet comprises a command including a first logical identifier: obtaining a second logical identifier, the second logical identifier being associated with said first logical identifier and identifying said one of said resources; and transmitting a request including said second logical identifier to a second control element, the second control element being arranged to identify a physical device associated with said second logical identifier and to forward said request to the identified physical device.

Aspects of the invention therefore allow one or more computing devices to access resources provided by at least one physical device. The at least one physical device may be managed by the second control element, which may take the form of a host bus adapter. While the second control element may associate second logical identifiers with the resources, it can be seen that the first control element allows the or each computing device to associate first logical identifiers with the resources, the first logical identifiers being different from said second logical identifiers.

The first control element can provide various other functionality. In particular, it can be seen that the first control element is adapted to determine whether the data packet comprises a command including a first logical identifier identifying one of said resources. Processing of the data packet can be carried out in dependence upon this determination. That is, only if it is determined that the data packet comprises a command including a first logical identifier is a second logical identifier obtained. This greatly improves the versatility and applicability of the first control element, in that the first control element is not restricted to only carrying out operations involving conversions between first and second logical identifiers, but can additionally be arranged to carry out other processing on data packets which are received which do not comprise commands including a first logical identifier.

The first control element may store data received from said at least one computing device. Such data can then be provided to a physical device in response to requests from said physical device. That is, the first control element may effectively act as a proxy in handling requests made by physical devices. Requests made by physical devices to a particular computing device can be redirected to the first control element by a switching device and responded to by the first control element.

Some aspects of the invention have particular applicability where the resources are storage resources, in particular logical storage units. Here the physical devices may take the form of a plurality of non-volatile storage devices (e.g. disks). The second control element may be arranged to define a relationship between the logical storage units and the non-volatile storage devices, and to allocate second logical identifiers to each of the logical storage units.

The first control element may be in communication with a switching device. The switching device may be arranged to determine whether the data packet satisfies a predetermined criterion, and to forward the data packet to the first control element if it is determined that the data packet satisfies the predetermined criterion. Data packets may be forwarded to the first control element by the switching device regardless of how such data packets are addressed. That is, the switching device may redirect data packets satisfying said predetermined criterion to said first control element regardless of an address specified by a data packet. For example, data packets associated with particular types of transactions defined in a particular protocol may be directed to the first control element, while data packets associated with other types of transactions defined in the particular protocol may not be directed to the first control element as addressed. For example, if it is determined that the data packet does not satisfy the predetermined criterion, the data packet may be forwarded from said switching device to one of the physical devices, possibly via an intermediate device such as the second control element.

Where it is determined that the data packet comprises a command including a first logical identifier, the method may further comprise validating the first logical identifier with reference to the computing device that transmitted the data packet. The second logical identifier may be obtained only if the first logical identifier is determined to be valid.

The method may further comprise receiving data indicating a second logical identifier for each resource provided by said at least one physical device. Such data may be received from the second control element. Such data may be received in response to a request made to the second control element by the first control element.

Data indicating relationships between said second logical identifiers and first logical identifiers associated with the or each computing device may be received. For example, the first control element may be in communication with a computing device running software arranged to define relationships between said first logical identifiers and said second logical identifiers. Data defining relationships between said second logical identifiers and first logical identifiers associated with the or each computing devices may be stored at the first control element.

A plurality of computing devices may be provided with access to the plurality of resources and the first control element may receive respective data packets from each of the plurality of computing devices.

Obtaining a second logical identifier associated with said first logical identifier may be based upon an identity of a computing device from which a respective data packet is received.

The method may further comprise storing data defining a plurality of relationships between at least one first logical identifier and a plurality of second logical identifiers, wherein each of said plurality of relationships is associated with a respective computing device.

The data packets may be PCI data packets.

Commands including the first logical identifier may take any suitable form and can be SCSI commands, SAS commands or SATA commands.

The logical identifiers can similarly take any convenient form. For example the logical identifiers can take the form of Logical Unit Numbers (LUNs) as defined in the SCSI protocol.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Embodiments of the present invention will now be described, by way of example, with reference to the accompanying drawings in which:

FIG. 6 is a mapping table stored by the virtualization proxy controller of FIG. 5 and used in the mapping of identifiers associated with logical storage units in the arrangement of FIG. 5;

Figure 1:
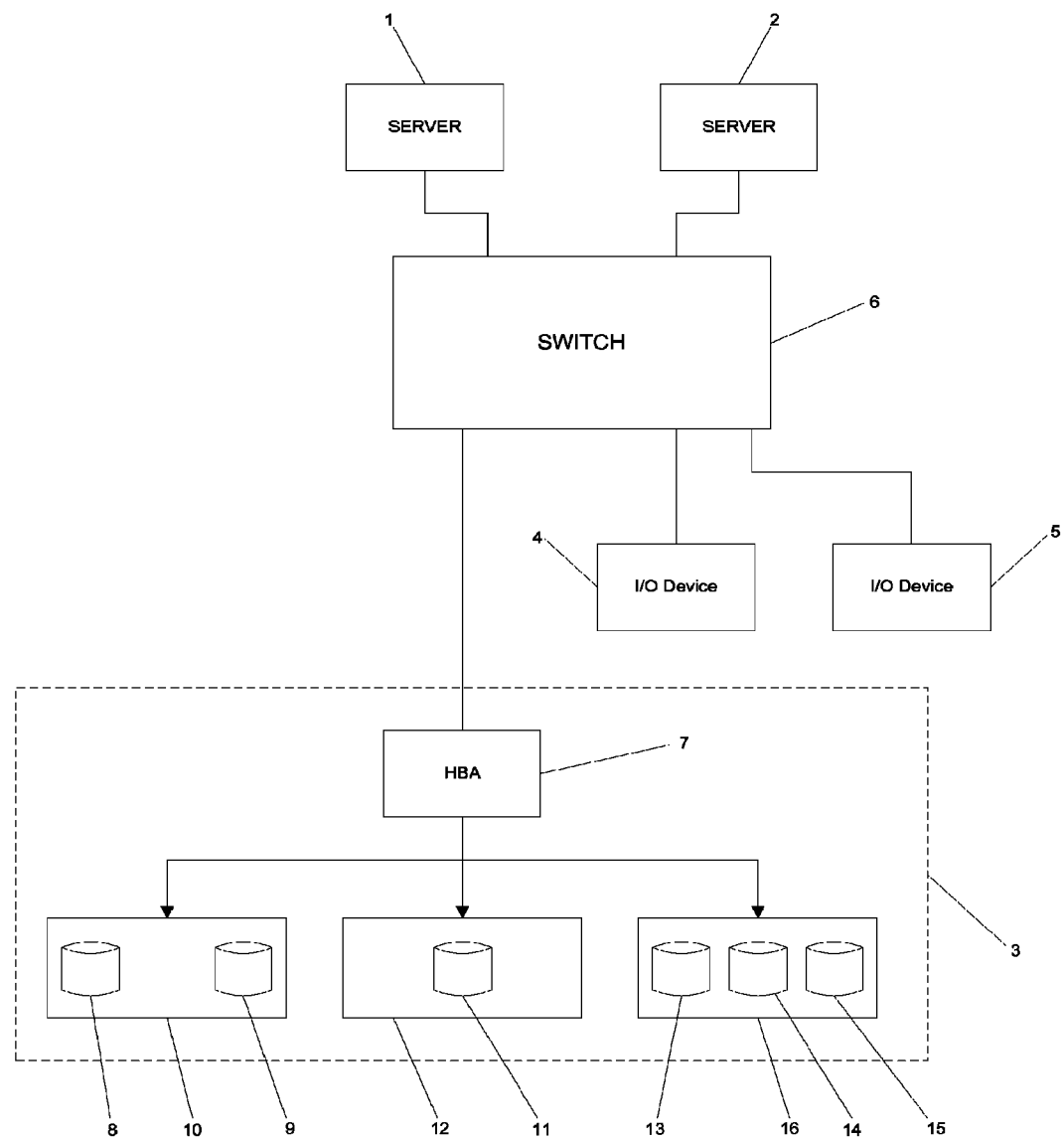
FIG. 1 is a schematic illustration of two servers connected to three input/output (I/O) devices by way of a switch.

Referring first to FIG. 1, two servers 1, 2 are connected to three input/output (I/O) devices 3, 4, 5 by way of a switch 6. The switch 6 is arranged to direct data packets between the servers 1, 2 and the I/O devices 3, 4, 5. The I/O devices 4, 5 can take any suitable form and may be, for example, network interface cards or graphics rendering devices. In the described embodiment the switch 6 is a PCI Express switch and the I/O devices and servers communicate with one another by exchanging PCI Express data packets.

The I/O device 3 is a storage device which operates using the Small Computer Systems Interface (SCSI) protocol. The I/O device 3 comprises a host bus adapter (HBA) 7, which controls access to six disks. It can be seen that two disks 8, 9 make up a first logical storage unit 10, while a single disk 11 makes up a second logical storage unit 12. Three disks 13, 14, 15 make up a third logical storage unit 16. Each of logical storage units 10, 12, 16 is allocated a Logical Unit Number (LUN) by the host bus adapter 7, and these allocated LUNs act as identifiers. The logical storage unit 10 has a LUN of '0', the logical storage unit 12 has a LUN of '1' and the logical storage unit 16 has a LUN of '2'.

The I/O device 3 may take any appropriate form, for example, the disks may be locally installed disks or may be disks in a blade server associated with the switch 6. Alternatively, the disks may be externally connected. Indeed, the disks of the storage device 3 need not necessarily be physically co-located.

Although the host bus adapter 7 is shown and described as part of the I/O device 3 for convenience, it should be noted that the host bus adapter 7 may be physically located with the switch 6, and may be logically considered to be associated with the switch 6.

The host bus adapter 7 is further configured to allocate particular logical storage units to a particular one of the servers 1, 2. That is, different logical storage units provided by the storage device 3 are allocated to different ones of the servers 1, 2. For example, the server 1 may be provided with access to the logical storage unit 10, while the server 2 may be provided with access to the two logical storage units 12, 16. Given that the server 2 is such as to require that storage devices are allocated LUNs starting from a LUN value of 0 (given constraints imposed by the operating system running on the server 2), the host bus adapter 7 is further configured to carry out mapping operations, such that commands received from the server 2 indicating a LUN value of '0' are directed to the logical storage unit 12 having a LUN value of '1' as allocated by the host bus adapter 7, and such that commands received from the server 2 having a LUN value of '1' are directed to the logical storage unit 16 having a LUN value of '2' as allocated by the host bus adapter 7. That is, the host bus adapter 7 is arranged to carry out mapping operations between LUN values used by the host bus adapter 7 to identify logical storage units, and LUN values used by the server 2.

The host bus adapter 7 is further configured to ensure that accesses to a particular logical storage unit are made from a server having authorized access to that particular logical storage unit.

The arrangement shown in FIG. 1 allows the servers 1, 2, to share the storage device 3, and more particularly to allow different logical storage units of the storage device 3 to be allocated to different servers. It can however be seen that such sharing is enabled by the host bus adapter 7. That is, the host bus adapter 7 must be configured to support sharing of the storage device 3 by the servers 1, 2.

Referring to FIG. 2, it can again be seen that the servers 1, 2 are connected to three I/O devices 3, 4, 5 by way of a switch 6. However, in the arrangement of FIG. 2, it can be seen that the storage device 3 is provided with a host bus adapter (HBA) 7a. While the host bus adapter 7a is arranged to configure the disks 8, 9, 11, 13, 14, 15 into the logical storage units 10, 12, 16, and to appropriately allocate LUNs to the logical storage units, the host bus adapter 7a is not configured to support sharing of the storage device 3 by the servers 1, 2.

Figure 2:
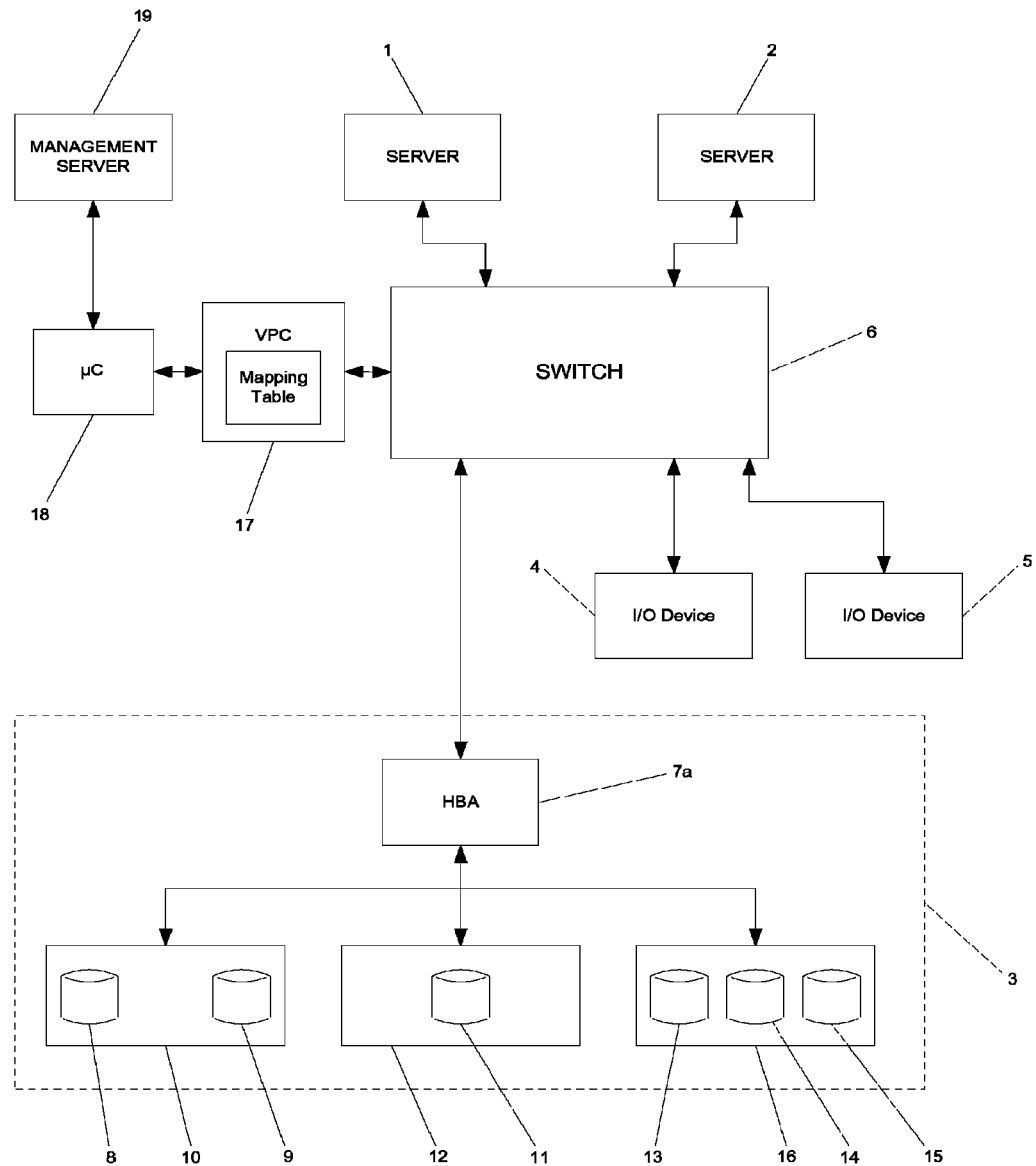
FIG. 2 is a schematic illustration showing the arrangement of FIG. 1 modified to provide a virtualization proxy controller (VPC)

It can be seen that the arrangement of FIG. 2 further comprises a virtualization proxy controller (VPC) 17. The virtualization proxy controller 17 appears to the servers 1, 2 as another I/O device. The virtualization proxy controller 17 is arranged to provide various functionality which allows the I/O devices 3, 4, 5 to be effectively shared by the servers 1, 2. The virtualization proxy controller 17 is in communication with a micro controller 18 which in turn communicates with a management server 19, operation of which is described below.

Figure 3:
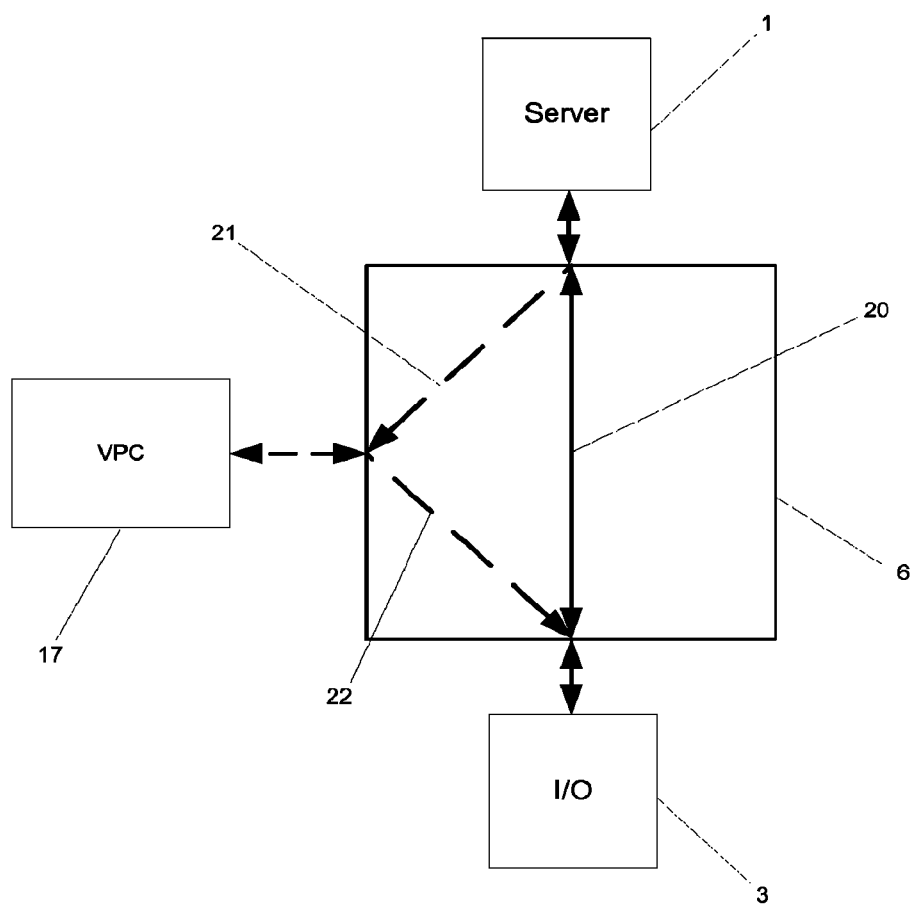
FIG. 3 is a schematic illustration showing how data packets are transferred between a server, an I/O device and the VPC in the arrangement of FIG. 2.

As indicated above, the switch 6 is generally arranged to allow data packets to pass between the servers 1, 2 and the I/O devices 3, 4, 5. Switching is generally based upon an address included within a data packet processed by the switch. Referring to FIG. 3, the switch 6 is again shown, as are the server 1, the I/O device 3 and the virtualization proxy controller 17. A path 20 shows the route taken by data packets which are passed between the server 1 and the I/O device 3. In order to allow sharing of the storage device 3, some data packets passing between the server 1 and the I/O device 3 are intercepted by the switch 6 and directed to the virtualization proxy controller 17 as indicated by a path 21. The virtualization proxy controller 17 also transmits data packets to the I/O device 3 along a path 22.

For example, in a preferred embodiment of the invention, data packets passed between the I/O device 3 and the server 1 are defined with reference to the PCI Express protocol. PCI Express data packets can, for present purposes, be considered to be part of either a control transaction or a data transaction. A transaction may involve a single data packet being passed from the I/O device 3 to the server 1 or vice versa. Alternatively, a transaction may comprise two phases, such that a data packet is sent from the I/O device 3 to the server 1 in a first phase, and a reply is sent from the server 1 to the I/O device 3 in a second phase. It will be appreciated that the directions of the first and second phases will vary depending upon the exact nature of the transaction. Data packets associated with control transactions are routed by the switch 6 to the virtualization proxy controller 17 (i.e. are routed along the paths 21, 22. Data packets associated with data transactions are routed directly between the I/O device 3 and the server 1 (i.e. are routed along the path 20).

Transactions using the PCI Express protocol can generally be classified into one of five classes:
1. Commands sent from a server to an I/O device;
2. Status read commands sent by a server relating to resources of an I/O device;
3. I/O device commands reading command descriptors in server memory;
4. I/O device commands writing status descriptors in server memory; and
5. I/O device commands reading/writing data buffers in server memory Transactions classified in classes 1 to 4 of the above list are considered to be control transactions, and data packets of such transactions are redirected to the virtualization proxy controller 17 as indicated above. Transactions classified in class 5 are considered to be data transactions and data packets of such transactions are not redirected to the virtualization proxy controller 30. It can be noted that data transactions make up the vast majority (approximately 90%) of transactions between servers and I/O devices.

It can therefore be appreciated that the switch 6 is configured to monitor the type of transaction with which a particular data packet is associated, and to forward the particular data packet to the virtualization proxy controller 17 if it is associated with a predetermined class of transactions so that the virtualization proxy controller 17 can process the data packet to allow sharing of the I/O devices by the servers. This processing means that all data packets associated with particular types of transactions are redirected to the virtualization proxy controller regardless of a destination specified within the data packets.

The virtualization proxy controller 17 is arranged to provide various functionality to allow the sharing of I/O devices connected to the switch 6. In particular the virtualization proxy controller 17 can ensure that a particular server only accesses a particular logical storage unit of the storage device 3 to which it has been allocated, and can also allow the servers 1, 2 to refer to a particular logical storage unit using a LUN different to that used by the I/O device 3. This can be achieved regardless of whether the host bus adapter 7a provided by the I/O device 3 is arranged to support sharing of the I/O device between servers.

Figure 4:
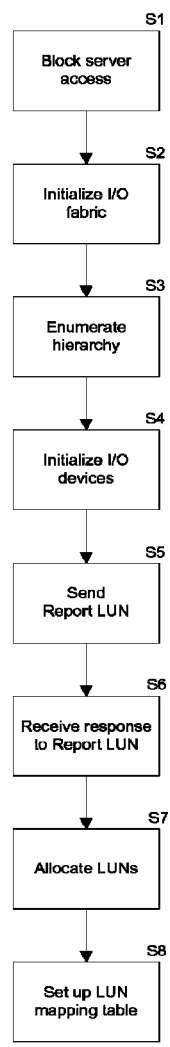
FIG. 4 is flowchart showing processing carried out to initialize the virtualization proxy controller of FIGS. 2 and 3.

Before describing operation of the virtualization proxy controller 17 in allowing sharing of the storage device 3, initialization of the arrangement shown in FIG. 2 is described with reference to FIG. 4, particularly with reference to initialization carried out to allow the virtualization proxy controller 17 to support sharing of the storage device 3.

First, at step S1 all accesses by the servers 1, 2 to the I/O devices 3, 4, 5 are blocked. Various methods are known in the art for blocking the accesses of servers to I/O devices through a switch, and these include techniques described in the Intelligent Platform Management Interface Specification v2.0 (Intel Corporation) and power strip control. Both example methods allow control over when the servers 1, 2 are powered, such that it can be ensured that the servers are not powered until after the switch 6 is configured. At step S2 the switch fabric is initialized. This initialization involves configuring the port table, the VS Bridge Table and the VS Table, as specified in the Multi-Root I/O Virtualization and Sharing Specification, version 0.9, as specified by the PCI Special Interest Group.

The switch 6 then proceeds at step S3 to enumerate the connected devices, before the connected I/O devices 3, 4, 5 are initialized at step S4. The initialization of the I/O devices 3, 4, 5 will be device specific.

At step S5, the virtualization proxy controller 17 issues a 'Report LUN' command defined using the SCSI protocol to all host bus adapters of connected SCSI devices. In this case, given that the only connected SCSI device is the storage device 3, the 'Report LUN' command is forwarded to the host bus adapter 7a of the storage device 3. The host bus adapter 7a provides a response to the 'Report LUN' command which is received by the virtualization proxy controller at step S6, and the response comprises details of the logical storage units defined by the host bus adapter 7a and their associated LUNs. That is, in the case of the arrangement shown in FIG. 2, the host bus adapter 7a indicates that three logical storage units 10, 12, 16 are managed by the host bus adapter 7a and that these logical storage units have respective LUNs of '0', '1' and '2'.

It was described above that the virtualization proxy controller 17 has an associated microcontroller 18 which is in communication with a management server 19. The microcontroller 18 is arranged to configure the virtualization proxy controller 17 based upon input received from the management server 19. More specifically, when the response to the 'Report LUN' command is received at step S6, an administrator is able to view details of the logical storage units associated with the storage device 3 using the management server 19 and to allocate the logical storage units associated with the storage device 3 to the servers 1, 2 as is appropriate at step S7. At step S8 a LUN mapping table is established which indicates which logical storage units are allocated to which of the servers 1, 2 and further indicates mappings between the LUNs used by the host bus adapter 7a, and the LUNs used by each of the servers 1, 2.

More specifically, in the arrangement shown in FIG. 2, the response to the 'Report LUN' command identifies LUNs '0', '1' and '2'. If the logical storage units associated with the LUNs '1' and '2' are allocated to the server 1 at step S7 and the logical storage unit associated with the LUN '0' is allocated to the server 2 at step S7, the virtualization proxy controller can then establish a mapping table of the following form at step S8:

TABLE 1

| HBA LUN | SERVER 1 LUN | SERVER 2 LUN |
|---------|--------------|--------------|
| 0       | —            | 0            |
| 1       | 0            | —            |
| 2       | 1            | —            |

This table indicates that references by the Server 1 to LUN 0 should be mapped to references to LUN 1 used by the host bus adapter 7a. Similarly, references by the server 1 to the LUN 1 should be mapped to references to the LUN 2 used by the host bus adapter 7a. References by the server 2 to the LUN 0 are mapped to references to the LUN 0 used by the host bus adapter 7a.

Figure 5:
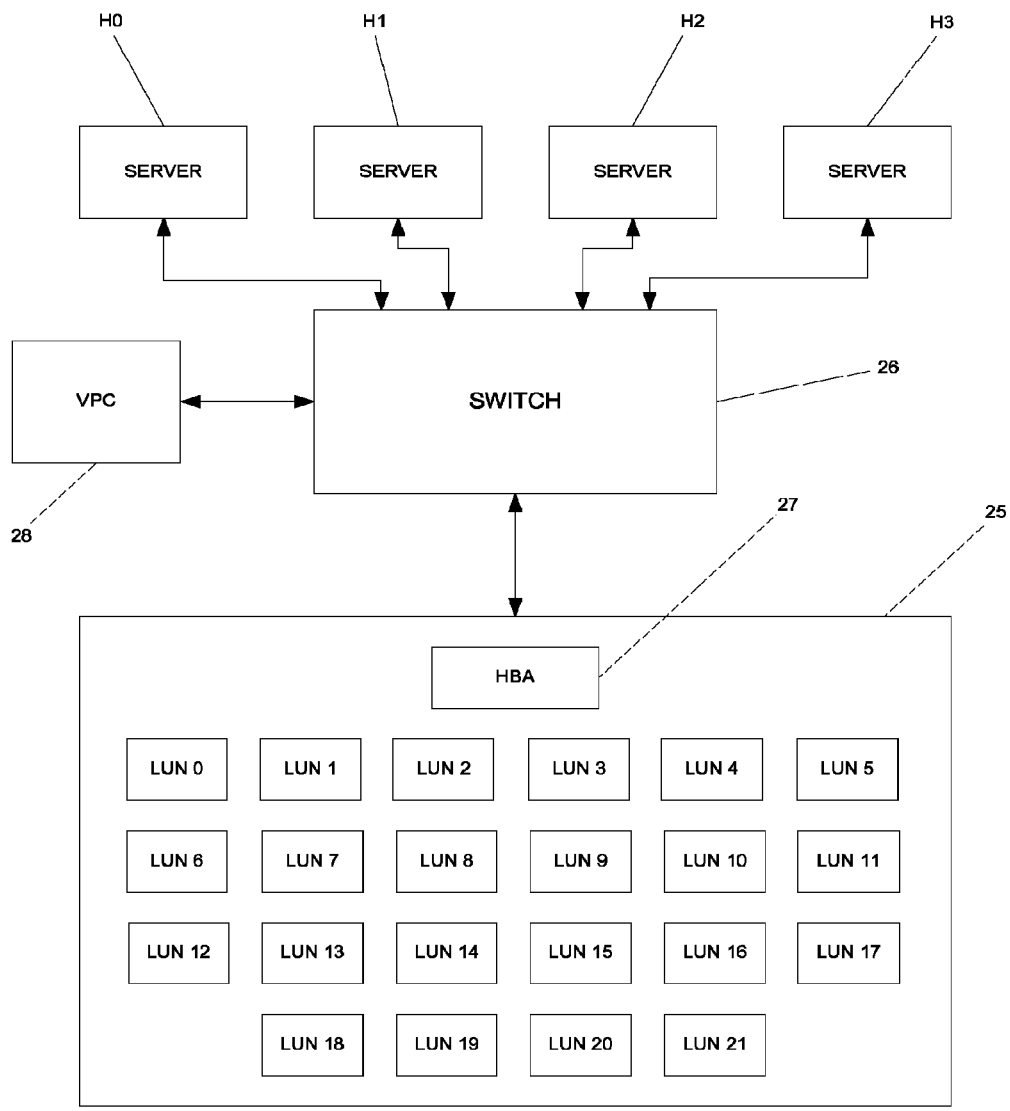
FIG. 5 is a schematic illustration of an arrangement in which four servers are provided with access to twenty-two logical storage units.

FIG. 5 shows an arrangement in which four servers H0, H1, H2, H3 are provided with access to a storage device 25 through a switch 26. It will be appreciated that other devices may be connected to the switch 26, but these are not shown in FIG. 5 for the sake of clarity. The storage device 25 provides twenty-two logical storage units, denoted in FIG. 5 by their respective LUN in the range 0 to 21. The storage device 25 also comprises a host bus adapter 27 which is arranged to configure disk storage of the storage device 25 so as to provide the twenty-two logical storage units. The disk storage of the storage device 25 is not shown in FIG. 5 for the sake of clarity, but it will be appreciated that the twenty-two logical storage units may be provided by any number of individual disks.

FIG. 5 further shows that the switch 26 is connected to a virtualization proxy controller 28 having the general form described above.

FIG. 6 shows a LUN mapping table for use by the virtualization proxy controller 28 in the arrangement of FIG. 5. A column 30 indicates an index for each row of the table. Four pairs of columns 31, 32, 33, 34 respectively store data relating to a particular one of the servers H0, H1, H2, H3. A column 35 indicates a server LUN. The column 35 (and indeed the table) will include as many entries as the maximum number of LUNs which are used by a single server. In the present example it can be seen that the maximum number of LUNs allocated to a single server is eight (allocated to the server H0), and consequently the mapping table comprises eight rows.

When a LUN is provided by one of the servers H0, H1, H2, H3, the provided LUN is used to locate the appropriate row of the table by performing a lookup operation using the column 35. One of the pairs of columns 31, 32, 33, 34 is then identified using the identifier of the server providing the LUN. The identified row of the first column of the identified pair of columns provides a LUN which can be provided to the host bus adapter 27 of the storage device 25. It can be seen that the second column of each pair of columns is a 'Valid Flag' indicating whether the provided LUN is valid for the particular one of the servers H0, H1, H2, H3. For example, given that only four LUNs are associated with the server H2, the only valid LUNs which can be provided by the server H2 are 0, 1, 2, 3. If the server H2 provides a LUN of, for example, 6, it can be seen that the identified row of the table includes a value of '0' in the relevant 'Valid Flag' column, indicating that the server H2 cannot validly provide a LUN of 6.

Figure 7:
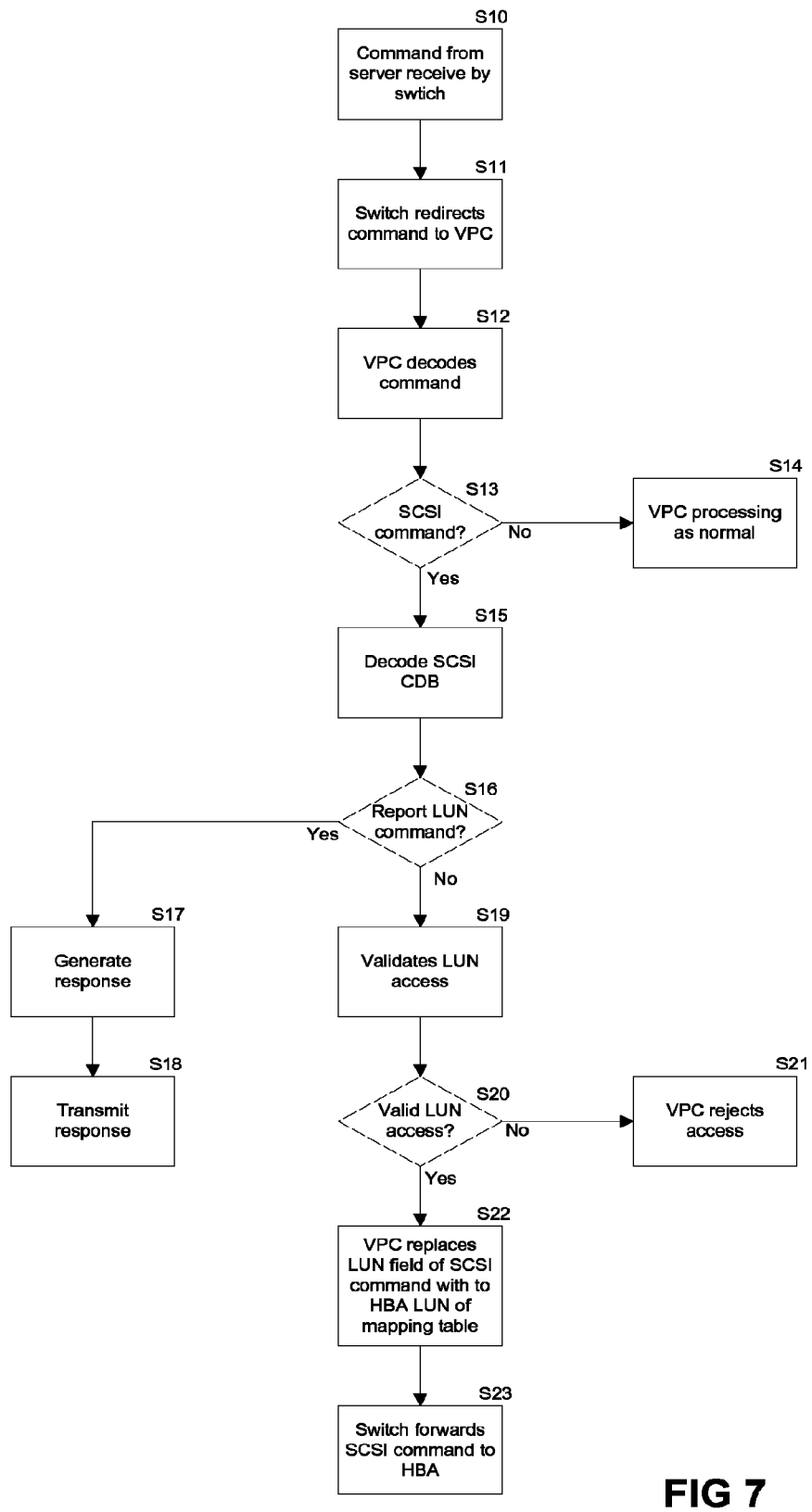
FIG. 7 is a flowchart showing processing carried out using the table of FIG. 6.

Operation of the virtualization proxy controller as outlined above is now described in further detail with reference to FIG. 7, and with reference to the arrangement of FIG. 5 and the mapping table of FIG. 6.

One of the servers H0, H1, H2, H3 makes a request to access the storage device 25. This request takes the form of PCI Express encapsulated SCSI command, given that the switch 26 to which the storage device 25 and the servers H0, H1, H2, H3 are connected is a PCI Express switch. At step S10 the PCI Express encapsulated SCSI command is received by the switch. At step S11 the switch determines that the received data packet is a command to an I/O device and forwards the data packet to the virtualization proxy controller 28, given that, as described above, command data packets are forwarded to the virtualization proxy controller 28. At step S12 the virtualization proxy controller 28 decodes the command included in the data packet and determines whether the command is a SCSI command. If the command is not a SCSI command processing passes to step S14 where the virtualization proxy controller 28 processes the received command. Such processing can take any suitable form and may involve, for example, the virtualization proxy controller 28 storing data provided within the received data packet in storage associated with the virtualization proxy controller 28 so as to be available for use in responding to requests received at the virtualization proxy controller from I/O devices, or alternatively may involve the virtualization proxy controller 28 generating a response which is sent to the relevant server.

If it is determined at step S13 that the received data packet contains a SCSI command, processing passes from step S13 to step S15. Here the virtualization proxy controller decodes the command descriptor block (CDB) of the SCSI command. The first byte of the command descriptor block is an opcode indicating an operation represented by the SCSI command.

It was described above that the virtualization proxy controller sends 'Report LUN' commands to storage devices to obtain details of provided logical storage units. Servers similarly make 'Report LUN' commands so as to obtain details of the logical storage units to which they have access. Given that LUNs used by servers differ from LUNs allocated by a storage device, a 'Report LUN' command issued by a server is responded to by the virtualization proxy controller.

As such, having decoded the command descriptor block of the SCSI command at step S15, processing passes to step S16 where a check is made to determine whether the received SCSI command is a 'Report LUN' command. If this is the case, a response to the 'Report LUN' command is generated at step S17 and provided to the server which issued the 'Report LUN' command at step S18.

If the check of step S16 indicates that the SCSI command is not a 'Report LUN' command, processing passes to step S19. Here, the virtualization proxy controller accesses the LUN mapping table shown in FIG. 6. The correct entry of the table is identified, and it is determined whether the provided LUN is valid given the server from which it was received using the appropriate 'Valid Flag' column. If the provided LUN is not valid, processing ends at step S21.

If the provided LUN is valid, processing passes from step S20 to step S22 where the virtualization proxy controller 28 obtains the appropriate LUN to be provided to the host bus adapter 27, and modifies the SCSI command so as to include that appropriate LUN. The modified SCSI command is then provided to the switch 26, again encapsulated within a PCI Express data packet. The switch 26 forwards the PCI express data packet including the encapsulated SCSI command to the I/O device 25 at step S23.

The preceding description has indicated that 'Report LUN' SCSI commands are identified at steps S16 and processed in a particular way. It will be appreciated that in some embodiments, other SCSI commands are also identified by processing carried out by the virtualization proxy controller so as to allow such commands to be processed in a particular way.

The preceding description has been concerned with sharing a storage device using the SCSI protocol. It will however be appreciated that the techniques described above could also be applied using any suitable protocol. Examples of suitable protocols include the Serial Attached SCSI (SAS) and Serial Advanced Technology Attachment (SATA) protocols. It should be noted that where the SAS protocol is used, commands may be enclosed within direct SAS data packets. In such a case, the virtualization proxy controller may be arranged to decode SAS data packets in accordance with the SAS protocol.

SCSI commands may be embedded within PCI Express data packets using a proprietary message format. In such a case the virtualization proxy controller may be adapted to decode the proprietary message format to access LUN information.

Further, the method described in the preceding description could be used to provide disk virtualization in a Fibre Channel environment by mapping Port identifiers in a similar manner to the mapping of LUNs described in the preceding description, as is now explained.

It is known to connect storage devices to servers over a Fibre Channel network. In general, each node (such as a server, or a host bus adapter) in a Fibre Channel network has a unique identifier known as a World Wide Node Name (WWNN). Each physical port of a node, known as an N_Port, has a physical port identifier, known as a World Wide Port Name (WWPN) which is unique to that node. Through combination of the WWNN and the WWPN, each N_port in a Fibre Channel network can be uniquely addressed.

It is also known for Fibre Channel switches to use a mechanism referred to as zoning to control access to storage resources. Typically, each N_Port is assigned to one or more groups (or zones) by the Fibre Channel switch. The switch may then control access to particular storage resources based on those groups. For example, certain groups may be authorized to access certain storage resources, while other groups are only authorized to access other storage resources. Where access to a particular storage resource is only permitted for a particular group, only those nodes with an N_Port belonging to that group will be able to access that storage resource.

It is further known for Fibre Channel switches to use the N_port Identifier virtualization (NPIV) facility, as specified in a part of the Fibre Channel standard (standard T11/02-338v1, as published by the T11 committee of the InterNational Committee for Information Technology Standards (INCITS), http://www.t11.org/ftp/t11/pub/fc/da/02-338v1.pdf), and supported by industry standard Fibre Channel host bus adapters. The NPIV facility allows a single physical N_Port to be allocated multiple virtual N_Port identifiers. Generally, the NPIV facility is used to provide multiple virtual machines on a single server with access to the same physical N_Port. Each virtual machine on a server can be allocated its own virtual N_Port, referenced by a virtual port offset (also known as a virtual port index). As such, each virtual machine has its own virtual port offset. Data packets originating from a particular virtual machine specify the virtual port offset assigned to that virtual machine. Upon receiving such data packets, the host bus adapter translates the server visible virtual port offset to a corresponding virtual N_Port identifier. The NPIV feature extends the zoning mechanism for use with virtual ports. Virtual ports can be assigned to groups such that access to storage resources can be controlled on the basis of which groups a particular virtual port belongs to.

The NPIV feature allows virtual ports to be provided to multiple virtual machines running on a single server. In a known system, an NPIV host bus adapter is dedicated to a particular server and allocates a consecutive sequence of virtual port offsets to virtual machines running on that server, typically in a range 0 to (n−1), where n is the number of virtual ports. Where a single NPIV host bus adapter is shared by multiple servers, in order to ensure that the server will operate correctly it is necessary to perform virtual port offset mapping in the manner described below.

For example, a server may request additional virtual ports at any time after the initial allocation of virtual ports (for example if a new virtual machine is initialised on the server). Given that each server expects to be allocated consecutive virtual port offsets, it is generally not possible to support virtual ports for multiple servers on the same host bus adapter as subsequent requests for virtual ports may result in servers being assigned non-consecutive virtual port offsets. Mapping non-contiguous virtual port offset ranges allocated by the host bus adapter to a new contiguous virtual port offset range seen by a server as described below ensures that the server will operate correctly without any changes to the server software.

Embodiments of the present invention may be used to extend virtual port functionality to support multiple servers sharing a single host bus adapter.

Operation of the virtualization proxy controller for a Fibre Channel storage device is now described.

Figure 8:
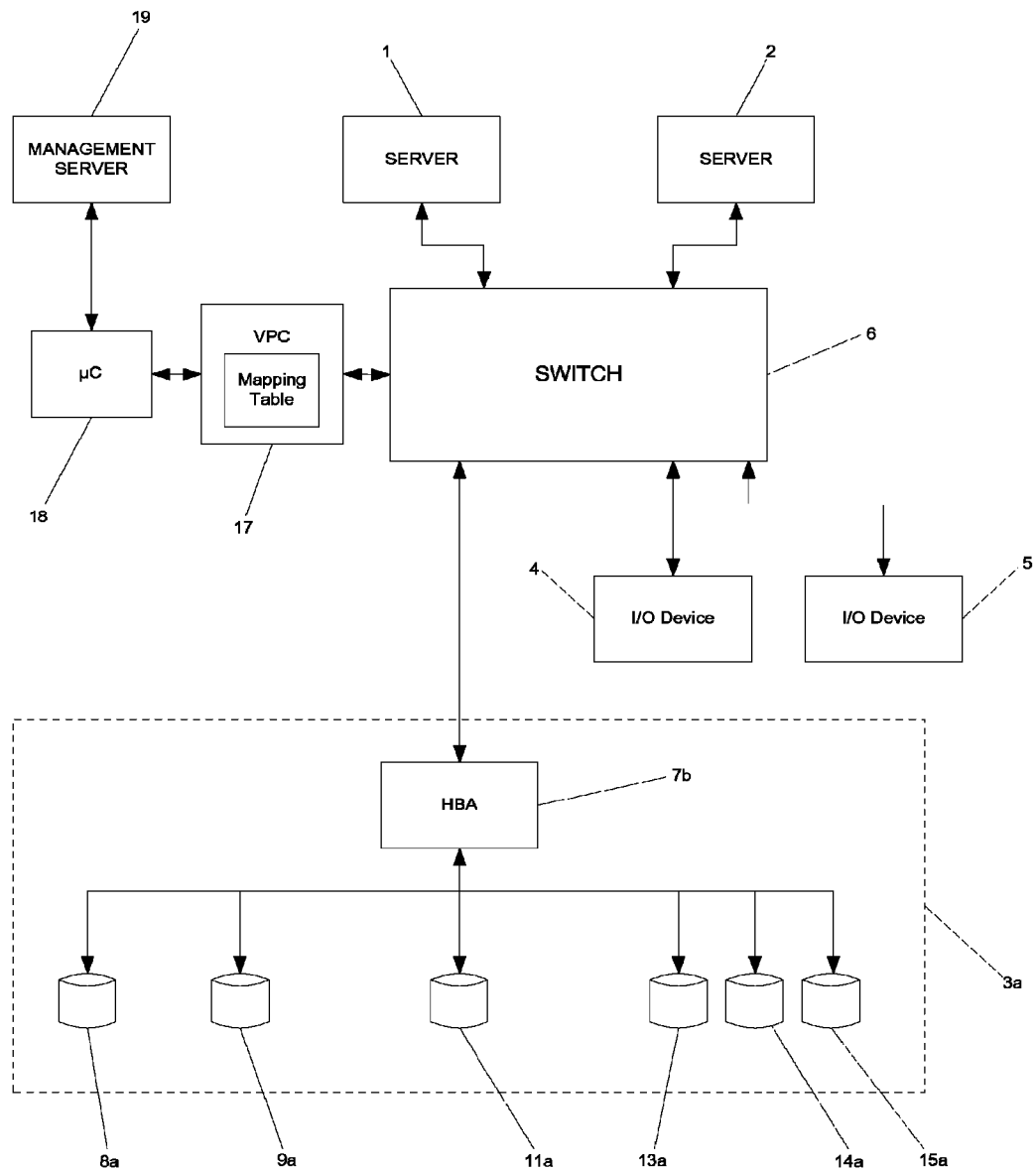
FIG. 8 is a schematic illustration showing the arrangement of FIG. 2 modified for use with Fibre Channel storage.

FIG. 8 shows the arrangement of FIG. 2 modified in that the switch is connected to a storage device 3a. The storage device 3a is a Fibre Channel storage device. The host bus adapter 7b is a Fibre Channel host bus adapter and is connected via Fibre Channel connections to disks 8a, 9a, 11a, 13a, 14a, and 15a. For clarity, logical storage units are not shown in FIG. 8.

The initialization of an arrangement using a Fibre Channel storage environment is now described with reference to FIGS. 8 and 9.

Figure 9:
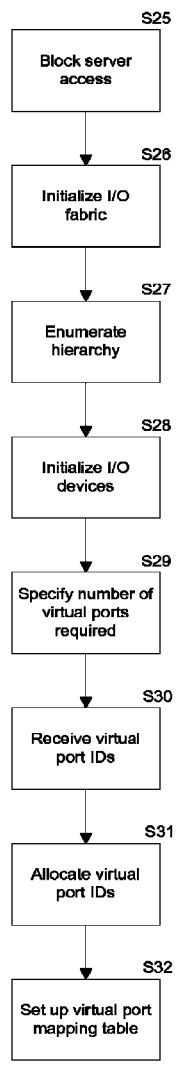
FIG. 9 is a flowchart showing processing carried out to initialize the virtualisation proxy controller of FIG. 8.

Referring to FIG. 9, steps S25 to S28 are as described with reference to steps S1 to S4 of FIG. 4. At step S29 an administrator specifies a number of virtual ports to be created via software running on the management server 19. In response to the administrator's actions at the management server 19, the virtualization proxy controller 17 issues commands to the host bus adapter 7b through the switch 6 to indicate to the host bus adapter 7b the total number of virtual ports to be created. The maximum number of virtual ports that may be created is dependent upon the particular host bus adapter. The maximum number of virtual ports that may be supported is two hundred and fifty-six as a virtual port identifier has eight bits reserved for addressing ports. However, not all host bus adapters support the maximum number of virtual ports and typically support in the region of sixty-four virtual ports.

After the host bus adapter 7b has configured the requested number of virtual ports, at step S30 the virtualization proxy controller 17 receives a list of virtual port offsets defined by the host bus adapter 7b. For example, if the host bus adapter 7b supports sixty-four virtual ports, the virtualization proxy controller 17 receives a list of sixty-four virtual ports and their corresponding virtual port offsets defined by the host bus adapter 7b. Processing then passes to step S31.

At step S31, an administrator, using software on the management server 19, may allocate a plurality of virtual ports to each of the servers 1, 2 as is appropriate. For each virtual port allocated to a server, the server will be provided with a corresponding virtual port offset. The virtual port offset allocated to the server through use of the virtualization proxy controller 17 and management server 19 is independent of the virtual port offset defined by the host bus adapter for that virtual port. At step S32 the virtualization proxy controller 17 establishes a virtual port offset mapping table, mapping the allocated host visible virtual port offsets to the virtual port offsets used by the host bus adapter 7b. If a server 1, 2 requires additional virtual ports after the initial allocation, the virtualisation proxy controller 17 may assign additional virtual port offsets following consecutively from the last virtual port offset assigned to that server.

After initialization, requests from a server 1, 2 specifying a virtual port offset are identified by the switch 6 and redirected to the virtualization proxy controller 17. The virtualization proxy controller 17 uses the specified virtual port offset as an index into the mapping table to map the virtual port offset specified by the server to a virtual port offset recognised by the host bus adapter 7b.

It may be the case that the servers 1, 2 do not support multiple ports. Where this is the case, the present invention may still be used to share a single Fibre Channel host bus adapter among a plurality of servers. In this case, the host bus adapter 7b is still configured by the virtualization proxy controller 17 for use of virtual ports, but instead of allocating multiple virtual ports to individual servers, each server is assigned a single virtual port.

It will be appreciated that where the present invention is employed in a switched fabric Fibre Channel environment, it may be necessary for data packets returned from the Fibre Channel host bus adapter to be redirected to the virtualization proxy controller to be mapped to the host. A mapping of this type may be performed using a separate mapping table or could use the same mapping table but with a CAM (Contents Addressable Memory) access strategy.

It will be appreciated that the preceding description has explained that the virtualization proxy controller can be arranged to process commands defined using any suitable command protocol. In some embodiments the virtualization proxy controller is provided in the form of a Field Programmable Gate Array, and is arranged to work only with commands defined using a given command protocol or protocols. However, in other embodiments the virtualization proxy controller may be provided using a programmable microcontroller so that the command protocols which can be decoded by the virtualization proxy controller can be easily configured.

It will be appreciated that the switching devices and virtualization proxy controllers described above can be provided in any convenient form. For example, while it has been explained that switching devices in some embodiments are arranged to direct particular data packets to a virtualization proxy controller, such switching devices can conveniently be realized by appropriate programming of a conventional switching device.

Similarly, the virtualization proxy controller can take any suitable form. While it was described with reference to FIG. 2 that the microcontroller 18 and the management server 19 were provided as components external to the virtualization proxy controller 17, it will be appreciated that in alternative embodiments of the invention a single unit may provide the functionality described as being associated with two or more of the virtualization proxy controller the microcontroller and the management server.

The embodiments described herein have been based upon a single mapping table for all servers having access to a particular device. It will be appreciated that in alternative embodiments each server may be provided with a separate table. In such a case differing numbers of rows may be included in different tables, as determined, for example, by the number of logical storage units to which a particular server has access.

While it is the case that embodiments of the present invention have been described with reference to PCI Express, the present invention could equally be applied to other communications technologies such as Infinband, RapidIO or Hypertransport.

It will be appreciated that the terms server, computer and computing device as used herein are intended broadly and are intended to cover any processing device. While the described embodiments are based upon relatively small numbers of servers communicating with relatively small numbers of I/O devices, it will be appreciated that in many embodiments a larger number of servers and/or I/O devices will be used.

It will be appreciated that all references to the SCSI protocol are merely exemplary. Any suitable protocol can be used. It will be appreciated that features described above in relation to specific SCSI commands can similarly be applied to commands of other protocols.

Further modifications and applications of the present invention will be readily apparent to the appropriately skilled person from the teaching herein, without departing from the scope of the appended claims.

The invention claimed is:

1. A method of providing one or more computing devices with access to a plurality of resources, the plurality of resources being provided by at least one physical device, the method comprising:
   receiving data by a first control element from a second control element, said data indicating a plurality of first logical identifiers each being used by the second control element to identify a respective resource of the plurality of resources; and
   storing data at the first control element defining relationships between said plurality of first logical identifiers and a plurality of second logical identifiers associated with at least one of said one or more computing devices;
   wherein each of the plurality of second logical identifiers is used by at least one of the one or more computing devices to identify one of the plurality of resources.

2. The method of claim 1, wherein said data indicating the plurality of first logical identifiers is received in response to a request from said first control element to said second control element.

3. The method of claim 1, further comprising-blocking access by said one or more computing devices to the at least one physical device before receiving data by the first control element from the second control element.

4. The method of claim 1, further comprising receiving data indicating relationships between said plurality of first logical identifiers and the plurality of second logical identifiers associated with at least one of said one or more computing devices.

5. The method of claim 4, wherein said data indicating relationships between said second logical identifiers and said first logical identifiers is based upon user input.

6. The method of claim 1, further comprising:
   storing data defining a plurality of relationships between at least one second logical identifier and the plurality of first logical identifiers, wherein each of said plurality of relationships is associated with a respective computing device.

7. The method of claim 1, further comprising identifying ones of the first logical identifiers in response to receiving indications of second logical identifiers from the one or more computing devices and providing indications of the first logical identifiers to the second control element.

8. The method of claim 1, wherein storing data at the first control element defining relationships comprises storing data indicating which of the one or more computing devices is validly associated with each of the second logical identifiers.

9. The method of claim 1, further comprising:
   receiving a request from one of said one or more computing devices, the request including one of the second logical identifiers;

using said one of the second logical identifiers to obtain one of the first logical identifiers based on the stored data; and transmitting a request including said one of the first logical identifiers to the second control element, the second control element being arranged to identify a physical device associated with the one of the first logical identifiers.

10. The method of claim 9, further comprising:

validating said one of the second logical identifiers with reference to the computing device that issued the request; and obtaining said one of the first logical identifiers only if said second logical identifier is valid.

11. The method of claim 1, wherein said plurality of resources comprise a plurality of logical storage units.

12. The method of claim 11, wherein each of the plurality of logical storage units comprises storage provided by one or more non-volatile storage devices.

13. The method of claim 1, wherein said plurality of resources comprise a plurality of Fibre Channel virtual ports.

14. An apparatus for providing one or more computing devices with access to a plurality of resources, the plurality of resources being provided by at least one physical device, the apparatus comprising a first control element which includes:

a first interface arranged to receive data from a second control element, said data indicating a plurality of first logical identifiers each being used by the second control element to identify a respective resource of the plurality of resources;

a memory for storing data defining relationships between said plurality of first logical identifiers and a plurality of second logical identifiers associated with at least one of said one or more computing devices wherein each of the plurality of second logical identifiers is used by at least one of the one or more computing devices to identify one of the plurality of resources; and a processor arranged to use the stored data to obtain one of the first logical identifiers in response to receiving one of the second logical identifiers from one of the one or more computing devices.

15. The apparatus of claim 14, further comprising a second interface arranged to transmit the obtained one of the first logical identifiers to the second control element.

16. The apparatus of claim 14, further comprising:

a switching device in communication with the first control element and arranged to forward data packets received from the one or more computing devices to the first control element if it is determined that the data packets satisfy a predetermined criterion.

17. The apparatus of claim 16, wherein the switching device is further arranged to forward data packets received from the one or more computing devices to the at least one physical device if it is determined that said data packets do not satisfy the predetermined criterion.

18. The apparatus of claim 14, wherein said plurality of resources comprise a plurality of logical storage units.

19. The apparatus of claim 18, wherein each of the plurality of logical storage units comprises storage provided by one or more non-volatile storage devices.

20. The apparatus of claim 14, wherein said plurality of resources comprise a plurality of Fibre Channel virtual ports.

* * * * *